Patented Feb. 23, 1943

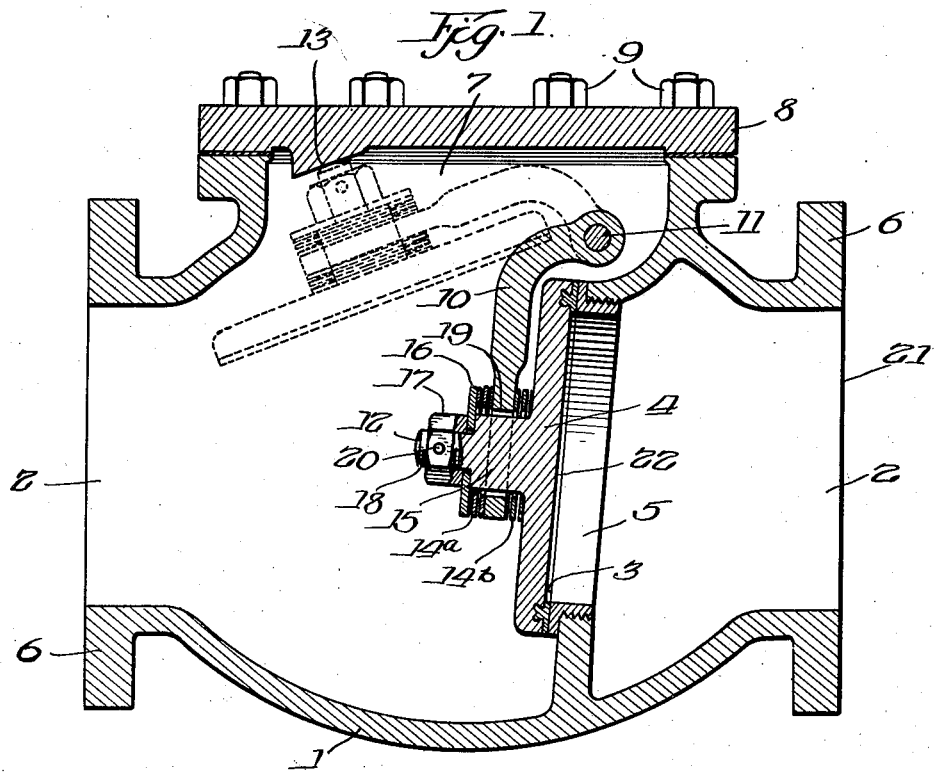

2,312,290

UNITED STATES PATENT OFFICE 2,312,290

VALVE

Watt V. Smith, Chicago, and Frederick R. Venton, Clarendon Hills, Ill., assignors to Crane Co., Chicago, Ill., a corporation of Illinois Application November 16, 1940, Serial No. 365,912

2 Claims. (Cl. 251—123)

Our invention relates to a swing check valve construction and, more particularly, to a flexible and resilient means for joining the closure member onto a suitable hinged supported member within its casing.

It has been determined that for best performance the closure member of a swing check valve should be non-rigidly attached to its operating or supporting member in order that the respective bearing surfaces of the closure member and of the body seat may contact one another throughout their circumference so as to produce a fluid-tight seal. The need for such a flexible means for self-alignment of the seating surfaces is particularly important in check valves in which the only force utilizable to press the seating surfaces together is the fluid pressure within the line. The usual method of attaining the desired flexible condition has been merely to make the hinge-disc connection a loose fit. Due to this necessary form of construction, excessive wear has usually occurred at the junction of the hinge and the body and at the connection between the disc and the hinge. Objectionable wear also has occurred at the valve seating surfaces due to the severe shock of impact which takes place and also due to the momentary vibration resulting when the movement of the disc and the hinge is suddenly arrested by their unyielding contact with the valve seat when the valve is closed. In addition, wear at the places mentioned, also occurs due to the sudden contact of the closure member with the casing or body itself when the valve is opened in the normal course of operation.

Manufacturers of swing check valves have done a great deal of experimentation over a period of several decades in attempting to improve the performance of valves of this type by making hinge-disc connections that would minimize the deleterious effects of the above referred to shock and vibration on the valve operating parts. However no one, to our knowledge based upon exhaustive test results, has succeeded in accomplishing the desired result to the degree which we have attained. Whereas frequent attempts in the past have been made to solve this problem by all kinds of rigid or loose, non-resilient disc-hinge connections, we recognized early in the development of our valve that such connections were not feasible from practical service standpoints. For that reason our work was concentrated on the development of a resilient, shock-absorbing disc-hinge connection which would be practical to manufacture economically and yet would be dependable in operation throughout a greater service life than heretofore provided.

At the outset, in order to more clearly explain our contribution to the art and to set forth more distinctly the novel, beneficial results achieved thereby, it is believed that a brief account of the development work leading up to our invention is desirable.

Various non-resilient means for relieving this shock were attempted with little or no success. To establish some standard for comparison of our invention employing a resilient connection with conventional types previously known to the art using non-resilient connections, operation tests were applied to 6" swing check valves of four well known manufacturers in the art, each valve having the conventional non-resilient connection between the hinge and the disc. After 100,000 impact operations, these valves were leaking excessively and when opened for inspection they were found to have failed mechanically, all the threaded parts having fallen out of place completely, or else had loosened, and the seating surfaces were battered out of shape due to the misalignment caused by the aforesaid loosening of parts. The fourth valve was operated 85,000 times additionally and was then found to have failed in the same manner. Various resilient disc connection modifications, using rubber washers on both sides of the hinge, were tried but their life, too, was limited to about 100,000 operations due to qualities inherent in the rubber used. The results of these tests with rubber washers pointed to the need for a resilient member which would not change its properties under the constant and severe pounding in service. Although the space on the back of the disc was limited and the strength and resilience requirements of such desirable resilient member were quite high, it was found that a short coil spring of rectangular cross-section could be made of the desired properties and could also be fitted into the available space on both sides of the hinge at the center of the disc thus providing a valve whose operating performance was good beyond all expectations. In the latter connection, a valve made in accordance with the foregoing description was tested in the same manner as were the four heretofore mentioned and it was still pressure tight after 600,000 operations.

Accordingly, a principal object of our invention is the provision of a resilient hinge-disc connection for a swing check valve employing a metallic spring on either one or both sides of the hinge to impart desired resiliency.

Other important advantages of the construction will become more readily apparent upon referring to the accompanying drawing, in which Fig. 1 is a sectional assembly view of one form of resilient disc-hinge connection applied to a conventional swing check valve.

Fig. 2 is a fragmentary sectional view of a modified form of construction.

Like numerals refer to like parts in the several views.

Broadly, the valve of our present invention may be representative of a number of types which are suitable for a wide variety of services. However, as shown in the drawing, we prefer to disclose our invention as it may be embodied in a valve of the swing check type in which the disc or closure member is mounted upon a hinge member, the latter being pivotally secured within the valve body or casing as hereinafter described in greater detail.

The valve body or casing generally designated 1 is of the usual type having a longitudinal through port or passageway 2 provided with a seat 3 for the disc or closure member 4. Preferably, but not necessarily, the seat 3 is made part of the flanged bushing 5 removably secured within the body 1. It is apparent, of course, that the seat may also be made integral with the body 1 and therefore not necessarily removable. The ends of the body 1 are provided with the usual means for attaching the valve to a pipeline and for that purpose the flanges 6 are shown. Obviously, other means such as screw threads may be employed for the pipe connections if desired. The upper portion of the body 1 has the flanged opening 7 normally closed by the blind flange or cap 8 secured to the valve by a number of bolts or studs 9. The hinge 10 having its upper end preferably connected to the shaft or pin 11, the latter being mounted within the valve body transverse to the run of the valve, carries the disc 4 which is attached to the lower or free end of the hinge 10. When the disc is in the open or flow-permitting position, as shown by the dotted lines in Fig. 1, a portion of the hinge 10 extends upwardly into the opening 7 with the threaded or stud portion 12 of the disc abutting the boss 13, which is cast integral with the cap 8, thereby positioning the disc for automatic return to the seat 3 in the event of a reversal of fluid flow through the valve.

Referring now more particularly to the means for providing a resilient connection between the disc 4 and the hinge 10, the relatively short, rectangular cross-sectional coil springs 14a and 14b are fitted upon and surround the axial extension 15 of the disc and are compressed against both sides of the hinge 10 by means of the shouldering washer 16 and the nut 17 and the integral threaded portion 18 respectively. The aperture 19 in the hinge 10 is sufficiently greater in diameter than the extension 15 so that a loose fit results between the hinge and the disc, thus providing the limitedly pivotal movement necessary for the seating surfaces to align themselves in making a fluid-tight seal. The nut 17 is locked removably onto the threaded portion 18 by means of the pin 20 which is driven respectively through the nut 17 and threaded portion 18. In the modified form of construction shown in Fig. 2, a through bolt 12a may be used in place of the integral extension 15 with equally good results.

To facilitate an appreciation of our invention in its application to the operation of the check valve, let it be assumed that the valve is connected to a pipeline in which fluid is intermittently flowing as in the exhaust from a reciprocating pump, air compressor or the like. Assume further that the check valve shown in Fig. 1 is connected into the outlet line of such a device for the purpose of allowing fluid to flow away from the pump but not back to it. When fluid is discharged from the pump it will flow into the valve at 21 and the pressure against the face 22 of the disc 4 will cause it to swing open promptly (dotted position) and into abutment with the boss 13. Here the spring 14a comes into action, probably functioning to cushion the stoppage of the hinge 10 whereby only the inertia of the closure member 4 must be suddenly absorbed by the threaded portion 12 and the boss 13; the inertia of the heavy supporting hinge 10 is presumably absorbed momentarily later over the time interval that it approaches the washer 16 in compressing the spring 14a. This follow-up of the hinge likewise probably serves to substantially minimize the vibration and wear which would be caused by the ordinary disc-hinge connection as it strikes the boss and bounces away several times in a vibratory manner before finally coming to rest under the influence of the lifting force of the flowing fluid. When the pump discharge stops, as when the pump piston comes to the end of its travel and the fluid comes to a standstill in the valve line, the disc drops suddenly to its seat. Now the spring 14b comes into action, probably functioning similarly to relieve the seating surfaces of the shock which would have resulted if the disc and hinge had been stopped suddenly as a unit, and the spring 14b likewise serves to dampen vibration as already explained in connection with the spring 14a.

While a mechanism has been shown in which a portion of the disc directly abuts a stopping boss in the open position, thereby absorbing the kinetic energy of the hinge, our invention is equally applicable to such valves in which it is desired to cause the hinge or an extension thereof (instead of a portion of the disc) to abut against a suitable stopping boss, thereby absorbing the kinetic energy of the disc instead of the hinge. The use of one or the other will naturally depend on the type and size of valve, for in some the hinge may be of heavier construction and in others the disc may be heavier and it will therefore usually be desirable to stop the lighter member suddenly in order that the inertia of the heavier member may be suitably absorbed.

While we have illustrated our invention by a pair of coil springs, it is apparent also that there are numerous other specific resilient devices which may be used within the spirit of our invention. For example, under some conditions only one coil spring may be sufficient to make a commercially successful valve; or else the resilient means may assume the form of superposed rubber sheets instead of the coil springs shown; or flat or dish-shaped spring washers may be used; or a plurality of relatively small coil springs or spring washers disposed about the central part of the disc.

We have illustrated our invention as being used with a rotatable disc but we do not desire to be limited to this form of construction for our resilient means obviously will operate as successfully with a non-rotatable type.

As previously pointed out, our invention is capable of other modifications which will readily occur to those skilled in the art. The particular form of the various elements involved is not essential as it is obvious that variations could be used without departing from the spirit of the invention.

We intend, therefore, to be limited only to the extent defined by the scope of the appended claims.

We claim:

1. A swing check valve comprising a casing, a closure member therefor, an extension on said closure member having a non-flexible enlarged removable end portion, the rear surface portion of the said closure member and enlarged removable end portion having a fixed distance therebetween, a supporting member pivotally hinged to the casing at one end and having an aperture at the other end adapted to fit loosely around the said extension, the said closure member being carried by said supporting member so that the valve is opened by fluid flowing in one direction and closed by reverse flow, coil springs interposed in a normally compressed manner respectively between the closure member and the hinged supporting member and between the latter member and the enlarged end portion of said extension, whereby a shock-absorbing device is provided to cushion the sudden stoppage of the supporting member at either limit of its travel.

2. In a swing check valve, a casing having a seat, a closure member therefor, a medially situated extension on the face of the closure member opposite the seating surface thereof, said extension having a nonflexible enlarged removable end flange in fixed relation to the said closure member, an apertured hinged support for the said closure member fitted loosely upon the said extension between the closure member and end flange, the said closure member being carried by the said hinged support so that the valve is opened by fluid flowing in one direction and closed by reverse flow, resilient means disposed in a normally compressed manner on both sides of the loosely fitted hinged support, the said hinged support and the said resilient means substantially filling the space between said closure member and the enlarged end flange, whereby the said closure member and the said hinged support are held in predetermined resilient and limitedly pivotal spaced-apart relation and whereby at the seated and unseated limits of travel of the said closure member each of said resilient means serves to cushion the sudden stoppage of the hinged support.

WATT V. SMITH.
FREDERICK R. VENTON.